US007800332B2

(12) United States Patent
Whinnery

(10) Patent No.: US 7,800,332 B2
(45) Date of Patent: Sep. 21, 2010

(54) MOTOR DRIVE SYSTEM AND METHOD FOR PREDICTING POSITION DURING POWER INTERRUPTION

(75) Inventor: Joseph Whinnery, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 404 days.

(21) Appl. No.: 12/062,915

(22) Filed: Apr. 4, 2008

(65) Prior Publication Data

US 2009/0058347 A1 Mar. 5, 2009

Related U.S. Application Data

(60) Provisional application No. 60/966,587, filed on Aug. 29, 2007.

(51) Int. Cl.
*G05D 3/00* (2006.01)

(52) U.S. Cl. ....................... 318/466; 318/286; 318/461; 318/369; 318/470; 318/468; 318/469; 701/49; 711/100

(58) Field of Classification Search ................. 318/466, 318/461, 286, 369, 468, 469, 470; 701/49; 711/100
See application file for complete search history.

(56) References Cited

U.S. PATENT DOCUMENTS 4,357,564 A * 11/1982 Deming et al. .............. 318/280
4,707,608 A * 11/1987 DiBianca .................... 250/389
4,730,152 A 3/1988 Foust et al.
5,410,226 A * 4/1995 Sekiguchi et al. ........... 318/266
5,440,944 A * 8/1995 Chen ......................... 74/89.21
5,483,135 A 1/1996 Parks
5,563,483 A * 10/1996 Kowall et al. ............... 318/283
5,974,552 A * 10/1999 Lim et al. ................... 713/300
6,064,165 A 5/2000 Boisvert et al.
6,100,657 A 8/2000 Lamm et al.
6,199,322 B1 * 3/2001 Itami et al. ..................... 49/139
6,710,562 B1 * 3/2004 Kalb et al. .................. 318/434
7,140,571 B2 * 11/2006 Hishon et al. ............ 242/390.8
2006/0049789 A1 3/2006 Keefover et al.

* cited by examiner

*Primary Examiner*—Rita Leykin
(74) *Attorney, Agent, or Firm*—Mark E. Duell, Esq.; Emerson Thomson Bennett

(57) ABSTRACT

A powered apparatus includes a driven component that is movable along a path and a drive motor that moves the driven component along the path. A motor speed detector monitors an instantaneous speed of the drive motor at each position along the path. An electronic control unit operates the drive motor and includes load profile data representing a number of motor loads associated with respective positions of the driven component along the path. A calculating component determines a calculated final rest position of the driven component by adding a current position of the driven component along the path and an adjustment coefficient representing an additional distance of travel along the path based on the instantaneous speed of the drive motor and a respective motor load associated with the additional distance of travel. A non-volatile memory component stores the calculated final rest position of the driven component.

20 Claims, 2 Drawing Sheets

MOTOR DRIVE SYSTEM AND METHOD FOR PREDICTING POSITION DURING POWER INTERRUPTION

This application claims priority to U.S. Provisional Patent Application No. 60/966,587 filed Aug. 29, 2007, which is incorporated herein by reference in its entirety.

I. BACKGROUND OF THE INVENTION

A. Field of Invention

This invention generally relates to motor drive systems for automated closure components such as vehicle windows. In particular, the invention relates to motor drives that can recover position information of the closure component in the event of a power failure.

B. Description of the Related Art

Powered controllers for closure components such as sunroofs and window lift systems offer automatic closure with an anti-pinch safety feature as a convenience to the customer. These controllers need to maintain accurate position information of their closure components in order to allow safe and effective anti-pinch capability. These systems include a motor drive system operated by an Electronic Control Unit (ECU).

During operation, the ECU typically does not save position information until the motor stops at the end of a closure operation. However, in the event of a power supply interruption, the ECU loses power without saving position information. The system must then disable the automatic closure operation until the motor can reacquire the position of the closure component.

In order to prevent the disabling of the automatic operation, a large capacitor is typically used to provide a short supply of emergency power to the ECU during interruptions of primary power. This large capacitor keeps the ECU operational long enough for the motor to come to a stop, at which time the ECU can save the position information and prevent loss of anti-pinch. However, such capacitors are large and expensive components and add considerably to the overhead of the system.

II. SUMMARY OF THE INVENTION

Some embodiments of the present invention relate to a powered apparatus including a driven component that is movable along a path between a first position and a second position and a drive motor that moves the driven component along the path. A motor speed detector is provided that monitors an instantaneous speed of the drive motor at each position along the path. An electronic control unit operates the drive motor between the first position and the second position. The electronic control unit includes a load profile component including load profile data representing a number of motor loads associated with respective positions of the driven component along the path. A calculating component is provided that determines a calculated final rest position of the driven component by adding a current position of the driven component along the path and an adjustment coefficient representing an additional distance of travel along the path based on the instantaneous speed of the drive motor and a respective motor load associated with the additional distance of travel. A non-volatile memory component stores the calculated final rest position of the driven component.

Other embodiments relate to a method of operating a motor-driven component. A step is performed of providing a motor for moving a driven component along a path between a first position and a second position. A step is performed of maintaining a load profile representing a plurality of motor loads corresponding to respective positions of the driven component along the path. The instantaneous speed of the motor is monitored at each position along the path. An interruption of power to the motor is detected. The instantaneous speed of the motor is compared with the motor load at a power interruption position along the path. An adjustment coefficient is calculated representing an additional distance of travel based on the instantaneous speed of the motor and the motor load at the power interruption position. A final rest position of the driven component is determined by adding the adjustment coefficient to the interruption position. The final rest position is stored in a non-volatile memory to be retrieved when power is restored.

Still other embodiments relate to a motor-driven system including a motor for moving a driven component along a path between a first position and a second position. A load profile component is included having a plurality of motor load data corresponding to respective positions of the driven component along the path. Means are provided for monitoring an instantaneous speed of the motor at each position along the path. Means are also provided for detecting an interruption of power to the motor. Also included are means for comparing the instantaneous speed of the motor with the motor load at a power interruption position along the path. Means are additionally provided for calculating an adjustment coefficient representing an additional distance of travel based on the instantaneous speed of the motor and the motor load at the power interruption position. Other means are provided for determining a final rest position of the driven component by adding the adjustment coefficient to the interruption position. Means are also provided for storing the final rest position in a non-volatile memory to be retrieved when power is restored.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

The present invention generally relates to systems and methods for driving a component along a path and comparing the speed of a drive motor with a known load corresponding to each position along the path, to determine an amount of additional travel from that point in the event of a loss of power. A final rest position of the driven component is calculated by adding this amount of additional travel to its current position. The final rest position is stored in a non-volatile memory component to be retrieved when power is restored.

Figure 1:
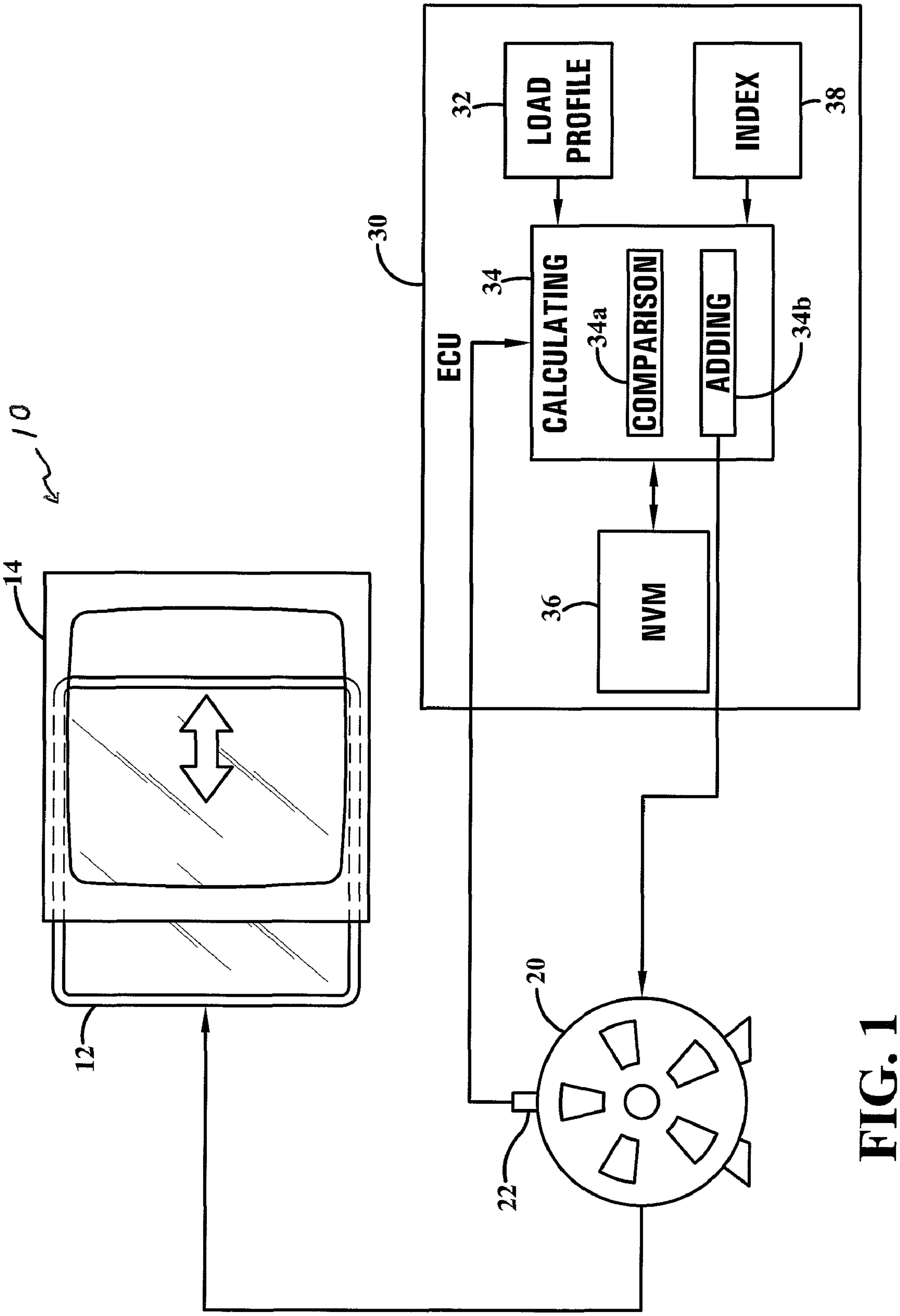
FIG. 1 is a schematic view illustrating a motor-driven apparatus in accordance with the present invention.

Reference is now made to the drawings wherein the showings are for purposes of illustrating embodiments of the invention only and not for purposes of limiting the same, and wherein like reference numerals are understood to refer to like components. FIG. 1 illustrates a powered apparatus 10 for displacing a driven component 12 that is movable along a path between a first position and a second position.

In the preferred embodiment, the driven component 12 is a power window in a vehicle, such as a sunroof or other type of window component that moves reciprocally between first and second positions, such as "open" and "closed" positions. The driven component 12 preferably moves within a frame 14, preferably a window frame that encircles and encloses the window component. However, it should be appreciated that the present invention can include any sort of powered, automated closure component that moves back and forth and is not limited to windows in a vehicle.

A drive motor 20 is provided that moves the driven component 12 along the path. In the preferred embodiment, the drive motor 20 is a conventional motor used in a vehicle to displace a window component such as a sunroof, and can include any sort of conventional linkage between the motor and the window such as is known in the art.

A motor speed detector 22 is provided that monitors an instantaneous speed of the drive motor at each position along the path. In the preferred embodiment, the motor speed detector 22 is a rotation detector for monitoring drive motor rotation. The instantaneous speed of the drive motor is measured from a period of drive motor rotation, e.g. where the motor speed detector counts the revolutions per minute (RPMs) or another suitable unit of measuring the rate of rotation.

The motor speed detector 22 is also used to measure a current position of the driven component along the path between the first and second positions. This current position is measured by counting rotations of the drive motor that represent motion of the driven component along the path. In the preferred embodiment, the motion speed detector 22 is a Hall sensor that measures pulses from one or more magnets on an armature of the drive motor.

An electronic control unit 30 is provided that operates the drive motor 20 between the first position and the second position. The electronic control unit (ECU) 30 is preferably a microprocessor driven computer unit that receives data from sensors and retains various system parameter data in memory. The ECU 30 uses this data to execute a number of functions related to the operation of the system. In the preferred embodiment, the ECU 30 is used in a motor vehicle and may be part of an on-board master computer system. Alternatively, the ECU 30 may be a dedicated computer unit strictly for controlling the operation of a window component such as a sunroof.

In connection with the ECU 30, it should be appreciated that a number of "components" are employed in the processing of data and the execution of the system as described herein. As used in this context, it should be understood that the term "component" is intended to refer to a computer-related entity, either hardware, firmware, a combination of hardware, firmware, and/or software, software alone, or software in execution. For example, a component may be, but is not limited to being, a process running on a processor, a processor per se, an object, an executable, a thread of execution, a program, a memory element or the memory data contained therein, and/or a computer. By way of illustration, both an application running on a computer and the computer itself can be a component. One or more components may reside within a process and/or thread of execution and a component may be localized on one computer and/or distributed between two or more computers.

The ECU 30 includes a load profile component 32 that maintains load profile data representing a plurality of motor loads associated with respective positions of the driven component 12 along the path. It should be appreciated that as e.g. a window component is moved between open and closed positions, different loads are encountered by the motor 20 since an uneven application of force may be required to overcome various points along the path, as is typical in such systems. For example, as the window approaches the closed position, the load will increase to move the window fully into engagement with the frame. The load profile data includes these known variations at a number of sample points along the path.

The ECU 30 also includes a calculating component 34 that determines a calculated final rest position of the driven component 12. The calculating component 34 adds the current position of the driven component 12 along the path with an adjustment coefficient representing an additional distance of travel along the path based on the instantaneous speed of the drive motor 20 and a respective motor load associated with the additional distance of travel.

During operation of the powered apparatus 10, the motor rotation is constantly monitored and updated by counting the Hall pulses from a magnet on the motor armature. In this way, the current position of the driven component 12 is constantly known to the ECU 30. The instantaneous average motor speed is calculated from the period of the Hall pulses. By knowing the motor speed and the masses and momentums of the motor 20 and the driven component 12, it is a simple calculation to find the kinetic energy of the motor and system.

The load profile at each position along the path is indicative of the load the experienced by the drive motor 20. The calculating component 34 includes a comparison component **34*a* that compares the instantaneous speed of the motor, as measured from the period of the Hall sensor pulses, with the respective motor load associated with the current position. By comparing the load with the kinetic energy of the motor 20 and driven component 12, the ECU 30 can calculate the number of motor rotations that can be expected from the motor 20, operating at the detected angular velocity, before the motor 20** would come to a complete stop, e.g. in the event of a loss of supply power.

These motor rotations can be reckoned in terms of an expected number of Hall pulses corresponding to the adjustment coefficient, i.e. rotations that the Hall sensors 22 can expect to detect before the drive motor 20, operating at the detected angular velocity, comes to a complete stop following a loss of the supply power. The calculating component 34 comprises an adding component **34*b*** that adds the expected number of Hall pulses to a detected number of Hall pulses corresponding to the current position, so as to calculate the final rest position.

By referencing the current position of the driven component 12 with the respective load data in the load profile component 32 for that position, the ECU 30 can determine how much load the system will experience over the next length of travel, e.g. the next 25 mm or so of travel, and accurately predict the number of motor rotations that will correspond to the load, as measured in Hall pulses. The calculating component 34 can thus make a precise determination of the final rest position of the driven component 12.

In this way, the ECU 30 adds the expected number of Hall pulses dictated by the load profile to the number of Hall pulses actually detected by the ECU 30 from the beginning of the drive motor's operation up to the moment when the supply power was lost. Based on this total number of Hall pulses, the position of the sunroof or other load driven by the drive motor when can be accurately predicted without requiring backup power to keep the ECU 30 operational in the event of a supply power loss.

The calculated final rest position of the driven component 12 is stored in a non-volatile memory component 36. This final rest position data is constantly refreshed so that an updated value is on hand at any given time. In the event of a detection of a power loss, the current position would represent a position where power to the drive motor 20 is interrupted. The non-volatile memory (NVM) 36 will enable the ECU 30 to "remember" the position of the driven component 12 once power is restored. This saved value of the calculated final rest position is read out and retrieved by the ECU 30 when power is restored. The NVM can be any suitable memory component, including but not limited to any programmable ROM such as EPROM or EEPROM or a flash memory or the like.

In an illustrative example, if a sunroof is closing from full slide open to the closed position and a system power interruption occurs, the ECU 30 can measure the motor RPM and then check the load profile for that position. If the current position is at a high load point, then the ECU 30 determines that the motor 20 will stop within e.g. 11 Hall pulses. The ECU 30 can then add 11 counts to the current position, and save this new value to non-volatile memory 36. Once this is saved to NVM 34, the ECU 30 "remembers" the position even if it is not activated following a power loss. Alternatively, if the sunroof is in a low load section of travel, ECU 30 may determine that the motor 20 will come to rest in e.g. 16 Hall pulses. It is to be appreciated that the number of Hall pulses can vary depending on the load and the parameters of any type of motor that can be selected.

The present invention allows position data to be saved immediately when power is lost. The invention allows position information to be saved without using large and expensive capacitors to provide energy after an ECU 30 has lost power. Because there is no need to maintain or extend the power of the ECU 30 during a power loss, the on-board power supply capacitor can be reduced in size or even omitted, thus saving cost, weight, and packaging space.

The ECU 30 also includes an index component 38 for maintaining a plurality of index positions to enable calibration of respective positions of the driven component, so as to compensate for position drift. The index positions preferably each correspond to a predetermined number of Hall pulses, so that the entire system may be referenced to motor rotations.

"Position drift" can result from minor deviations between the actual and predicted positions of the driven component 12, e.g. a sunroof, following repeated supply power losses. These deviations can accumulate and produce erroneous position information, thereby significantly affecting the operation of the system. The index positions are known positions along the path corresponding to recurrent load transient events in the system operation, such as when a sunroof is transitioned from an open state to a closed state.

The ECU 30 recognizes the load transient that identifies the sunroof's position as being closed. Since the position of the sunroof is known at each particular load transient event, the ECU 30 calibrates these positions to tare as index position events, each corresponding to a known quantity of Hall pulses from the time the motor 20 was activated. The values of these index positions are saved for future reference.

One or more index events are mapped during the travel of the driven component 12. For example, a sunroof system can include a "vent" state where the window moves up and down, as compared to an "open/close" state where the sunroof slides forward and back. In operation, the sunroof can pass from Vent to Open, or from Open to Close or Vent.

The system efficiency changes when the mechanism linkages change motion between these states. This change in the mechanical system has a significant load transient and therefore a unique load signature, as encountered at the motor 20. The motor 20 can speed up and slow down significantly within a few revolutions across these transition points. These maximum and minimum speed changes can be mapped to specific regions of travel of the sunroof, which in turn can be correlated to a specific Hall pulse count positions, thereby establishing index positions that are saved in the index component 38.

In this way, cumulative predictive errors can be eliminated by re-establishing the count of the index event when the sunroof passes through the "close" region of the path. As a result, if the ECU 30 incorrectly estimates the position of the sunroof, an accurate position can be re-established every time the driven component 12 passes this index event having a distinctive load transient signature that is recognized by the ECU 30.

In an illustrative exemplary embodiment, the system may always have a sharp drop in load at 580 counts and a sharp increase of load at 597 counts. The ECU 30 can make a determination of a position correction when the driven component 12 passes through this count region. If the maximum and minimum motor speeds are observed to be shifted by e.g. five Hall pulses, the ECU 30 can observe this event and record the new values in the load profile.

Figure 2:
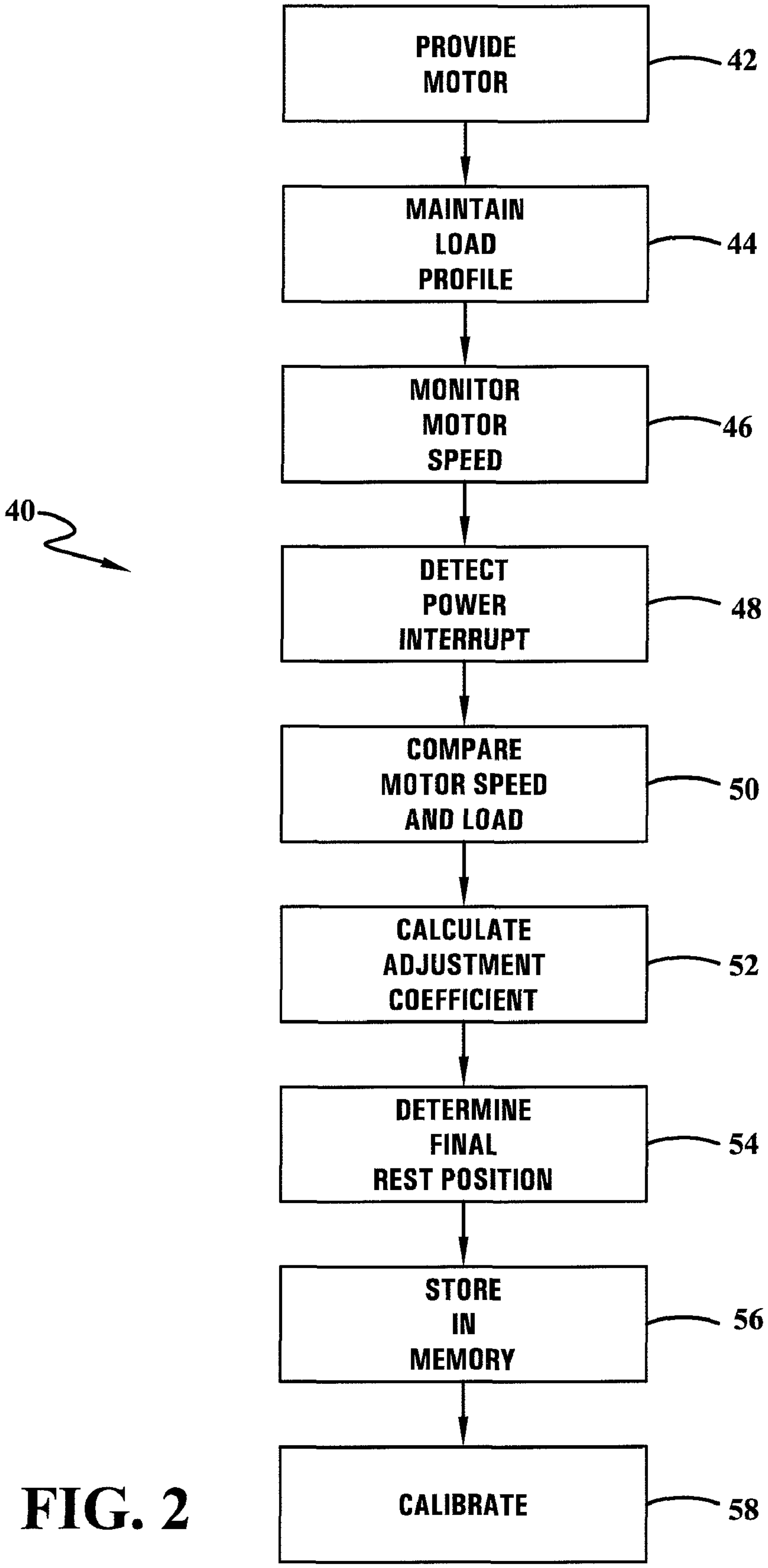
FIG. 2 is a flow chart depicting a method in accordance with the present invention.

FIG. 2 is a flow chart depicting a method 40 of operating a motor-driven component. It should be appreciated that the present method can be performed by an on-board electronic control unit that is installed in a system during manufacture, or can be retrofitted onto an existing system in an aftermarket installation operation.

A step 42 is performed of moving a driven component with a motor along a path between a first position and a second position. In the preferred embodiment, the driven component is a vehicle window component and the first and second positions are open and closed positions of the window component. A step 44 is then performed of maintaining a load profile representing a plurality of motor loads corresponding to respective positions of the driven component along the path. Another step 46 of monitoring an instantaneous speed of the motor is performed at each position along the path.

A step 48 of detecting an interruption of power to the motor is then performed. Another step 50 is performed of comparing the instantaneous speed of the motor with the motor load at a power interruption position along the path. In the preferred embodiment, the step 50 of comparing includes comparing the motor load with a kinetic energy of the motor calculated from the instantaneous speed of the motor.

A step 52 is performed of calculating an adjustment coefficient representing an additional distance of travel based on the instantaneous speed of the motor and the motor load at the power interruption position. A step 54 of determining a final rest position of the driven component is performed by adding the adjustment coefficient to the interruption position. Another step 56 is performed of storing the final rest position in a non-volatile memory to be retrieved when power is restored.

As mentioned hereinabove, the step 46 of monitoring the instantaneous speed of the motor preferably includes monitoring rotation of the motor to measure a rate of rotation and the position of the driven component along the path. The monitoring rotation preferably includes using a Hall sensor to count Hall pulses from a magnet on an armature of the motor. The instantaneous speed of the motor is thus monitored by measuring a period of the Hall pulses from the magnet on the armature of the motor. Determination of the final rest position therefore corresponds to a respective number of Hall pulses representing rotations of the motor.

Further to the above, the step 50 of comparing the instantaneous speed of the motor with the motor load is preferably performed by correlating an expected number of Hall pulses expected to be detected before the motor, operating at a detected angular velocity under the respective motor load, comes to a complete stop following a loss of the supply power. The adjustment coefficient is calculated by adding the expected number of Hall pulses to a detected number of Hall pulses corresponding to the position of the driven component along the path.

An additional step 58 is optionally or periodically performed of calibrating the respective positions of the driven component to respective index positions. Preferably, the positions of the driven component correspond to predetermined numbers of Hall pulses, so as to compensate for position drift. In this way, the method provides a self-correcting method of operating a driven component that compensates for power outages without requiring additional power supply components that are expensive and require considerable space.

According to some embodiments when the ECU restarts the motor after a power interruption, the embodiment is adapted to determine whether the actual starting load correlates to the expected load at the predicted restart position. If there is a mismatch, then the ECU stops motor operation. The ECU the restarts the motor a second time and again determines whether the actual starting load correlates with the expected load. If there is still a mismatch the ECU stops motor operation, and only manual operation is permitted until an index event occurs that allows the motor to re-establish true driven component position.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

Having thus described the invention, it is now claimed:

I claim:

1. A powered apparatus comprising:

a driven component that is movable along a path between a first position and a second position;

a drive motor that moves the driven component along the path;

a motor speed detector that monitors an instantaneous speed of the drive motor at each position along the path; and an electronic control unit that operates the drive motor between the first position and the second position, the electronic control unit comprising:

a load profile component comprising load profile data representing a plurality of motor loads associated with respective positions of the driven component along the path;

a calculating component that determines a calculated final rest position of the driven component by adding a current position of the driven component along the path and an adjustment coefficient representing an additional distance of travel along the path based on the instantaneous speed of the drive motor and a respective motor load associated with the additional distance of travel; and a non-volatile memory component for storing the calculated final rest position of the driven component.

2. The powered apparatus of claim 1, wherein the current position comprises a position where power to the drive motor is interrupted, wherein the calculated final rest position is retrieved by the electronic control unit when power is restored.

3. The powered apparatus of claim 1, wherein the driven component comprises a power window in a vehicle.

4. The powered apparatus of claim 1, wherein the motor speed detector comprises a rotation detector for monitoring drive motor rotation, wherein the instantaneous speed of the drive motor is measured from a period of drive motor rotation, and the current position is measured by counting rotations of the drive motor representing motion of the driven component along the path.

5. The powered apparatus of claim 4, wherein the rotation detector comprises a Hall sensor that measures pulses from a magnet on an armature of the drive motor.

6. The powered apparatus of claim 5, wherein the calculating component comprises a comparison component that compares the instantaneous speed of the motor, measured from a period of Hall sensor pulses, with a respective motor load associated with the current position, to determine an expected number of Hall pulses corresponding to the adjustment coefficient.

7. The powered apparatus of claim 6, wherein the calculating component comprises an adding component that adds the expected number of Hall pulses to a detected number of Hall pulses corresponding to the current position, so as to calculate the final rest position of the driven component.

8. The powered apparatus of claim 5, wherein the electronic control unit further comprises an index component for maintaining a plurality of index positions each corresponding to a predetermined number of Hall pulses, to enable calibration of respective positions of the driven component, so as to compensate for position drift.

9. The powered apparatus of claim 1, wherein the driven component comprises a vehicle window component and the first and second positions comprise open and closed positions of the window component.

10. A method of operating a motor-driven component comprising:

moving a driven component with a motor along a path between a first position and a second position;

maintaining a load profile representing a plurality of motor loads corresponding to respective positions of the driven component along the path;

monitoring an instantaneous speed of the motor at each position along the path;

detecting an interruption of power to the motor;

comparing the instantaneous speed of the motor with the motor load at a power interruption position along the path;

calculating an adjustment coefficient representing an additional distance of travel based on the instantaneous speed of the motor and the motor load at the power interruption position;

determining a final rest position of the driven component by adding the adjustment coefficient to the interruption position; and storing the final rest position in a non-volatile memory to be retrieved when power is restored.

11. The method of claim 10, wherein comparing the instantaneous speed of the motor with the motor load comprises comparing the motor load with a kinetic energy of the motor calculated from the instantaneous speed of the motor.

12. The method of claim 10, wherein monitoring an instantaneous speed of the motor comprises monitoring rotation of the motor to measure a rate of rotation and the position of the driven component along the path.

13. The method of claim 12, wherein monitoring rotation comprises counting Hall pulses from a magnet on an armature of the motor.

14. The method of claim 13, wherein monitoring an instantaneous speed of the motor comprises measuring a period of the Hall pulses from the magnet on the armature of the motor.

15. The method of claim 13, wherein comparing the instantaneous speed of the motor with the motor load comprises correlating an expected number of Hall pulses expected to be detected before the motor, operating at a detected angular velocity under the respective motor load, comes to a complete stop following a loss of the supply power.

16. The method of claim 15, wherein calculating an adjustment coefficient comprises adding the expected number of Hall pulses to a detected number of Hall pulses corresponding to the position of the driven component along the path.

17. The method of claim 13, wherein determination of the final rest position corresponds to a respective number of Hall pulses representing rotations of the motor.

18. The method of claim 13, further comprising calibrating the respective positions of the driven component to respective index positions where the position of the driven component corresponds to a predetermined number of Hall pulses, so as to compensate for position drift.

19. The method of claim 10, wherein the driven component comprises a vehicle window component and the first and second positions comprise open and closed positions.

20. A motor-driven system comprising:

a motor for moving a driven component along a path between a first position and a second position;

means for maintain a load profile representing a plurality of motor loads corresponding to respective positions of the driven component along the path;

means for monitoring an instantaneous speed of the motor at each position along the path;

means for detecting an interruption of power to the motor;

means for comparing the instantaneous speed of the motor with the motor load at a power interruption position along the path;

means for calculating an adjustment coefficient representing an additional distance of travel based on the instantaneous speed of the motor and the motor load at the power interruption position;

means for determining a final rest position of the driven component by adding the adjustment coefficient to the interruption position; and means for storing the final rest position in a non-volatile memory to be retrieved when power is restored.

* * * * *